United States Patent [19]

Piekarski et al.

[11] 3,755,274
[45] Aug. 28, 1973

[54] CATALYST AND PROCESS FOR THE PREPARATION OF POLYETHYLENES HAVING A NARROW MOLECULAR-WEIGHT DISTRIBUTION

[75] Inventors: Gottfried Piekarski; Anton Hundmeyer; Dieter Kippe; Sigmund Maier, all of Burghausen, Germany

[73] Assignee: Wacker-Chemie GmbH, Munich, Germany

[22] Filed: May 16, 1972

[21] Appl. No.: 253,887

[30] Foreign Application Priority Data
May 26, 1971 Germany.................. P 21 26 250.0

[52] U.S. Cl..... 260/88.2 R, 252/429 B, 252/431 R, 260/94.9 C
[51] Int. Cl............................ C08f 1/44, C08f 3/06
[58] Field of Search .................... 252/429 B, 431 R; 260/88.2, 94.9 C, 94.9 E

[56] References Cited
UNITED STATES PATENTS
3,202,617 8/1965 Enk et al........................ 260/94.9 E
3,661,878 5/1972 Aishima et al................. 260/94.9 C FOREIGN PATENTS OR APPLICATIONS
1,016,512 1/1966 Great Britain Primary Examiner—Joseph L. Schofer
Assistant Examiner—Edward J. Smith
Attorney—Nelson Littell, Nelson Littell, Jr. et al.

[57] ABSTRACT

A catalyst for the production of polyethylene and modified polyethylene having a narrow molecular weight distribution comprising the reaction product of (A) a reaction product of one mol of trialkyl aluminum having from two to eight carbon atoms in each of the alkyls with from one to two mols of a polysiloxane having a viscosity of from 5 to 100 cSt (25°C) and monomer units having the formula

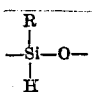

where R is alkyl having one to six carbon atoms, cycloalkyl or aryl and (B) a compound of the formulae

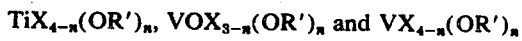

where X is a halogen, R' is alkyl having one to eight carbon atoms or cycloalkyl and n has a value between 0.1 and 2, or mixtures of said compounds, as well as a method of producing polyethylene and modified polyethylene having a narrow molecular weight distribution utilizing said reaction product catalyst.

12 Claims, No Drawings

CATALYST AND PROCESS FOR THE PREPARATION OF POLYETHYLENES HAVING A NARROW MOLECULAR-WEIGHT DISTRIBUTION

THE PRIOR ART

The preparation of polyethylene at relatively low pressures utilizing catalysts from polymeric organo-silicon compounds with silicon hydrogen bonds, such as methylhydrogen polysiloxane, compounds of the IV to VI sub-groups of the Periodic System, such as titanium tetrachloride or mixtures of titanium tetrachloride and esters of O-titanic acid, and aluminum compounds, such as aluminum chloride, have been known (German Pat. No. 1,191,105). According to this process, a polyethylene with predominately wide molecular-weight distribution is obtained. According to German Pat. (DBP) No. 973,626 and the German Auslegeschriften (DAS) No. 1,012,460 and 1016 022, for the polymerization of ethylene, catalysts of aluminumalkyls or aluminum hydrogen compounds, such as triethyl aluminum, diethyl aluminum chloride or diethyl aluminum hydride and titanium compounds, such as titanium tetrachloride (Ziegler-catalysts), are used. The polyethylene thus obtained, likewise has a widely distributed molecular-weight range and possesses the disadvantageous property of being obtained as a loose and often fibrous product, which has to be subjected to a compression or granulation before the plastic processing. The named Ziegler-catalysts are besides relatively unstable and quickly lose their activity (Meskova, Plast. Massy (1963) No. 7, 9–12 =Hochmolekularbericht 1963, No. 21,2878; also U.S. Pat. No. 3,065,220, column 4).

According to Wesslau, Makromoleculare Chemie, 26 (1958), 102 – 118 and German DBP No. 1,117,875, by introduction of alkoxy groups into Ziegler- catalyst systems, polyethylenes with narrow molecular-weight distribution can be successfully prepared (for example mixed catalyst from alkylaluminum sequichloride and mono- and dichloroorthotitanic acid esters). These catalyst systems require, particularly if the polymerization is conducted in the presence of hydrogen as molecular-weight regulator, a higher charge of catalyst, such as 37 gm/kg of polyethylene as distinct from the pure Ziegler systems. This is disadvantageous in regard to the expense for the purification of the polyethylene.

Furthermore, catalysts of organo-silicon compounds, aluminumalkyls and titanium compounds for the polymerization of ethylene and α-olefins have also been known. According to the British Pat. No. 1,016,512, the three classes of substances are used in situ, without a preceding reaction, for the polymerization, whereby on the basis of the different reaction velocities of aluminumalkyl with titanium compounds, on the one hand, and organo-silicon compounds with titanium compounds, on the other hand, obviously different catalyst systems are formed side by side. With these catalysts, silicon-containing polymers with a broad molecular-weight distribution are obtained.

Likewise, according to the process of the German Offenlegungsschrift (DOS) No. 1,936,205, catalysts of these three substance classes are prepared. In this procedure, however, first an aluminumsiloxane is isolated, and the latter subsequently reacted with a titanium compound. With such catalysts indeed narrowly molecular-weight distributed polyethylenes can be prepared. However, the catalyst preparation is very expensive. In addition, the aluminumsiloxane, isolated in the first reaction step from the reaction between methylhydrogenpolysiloxane and triethyl aluminum, obviously forms with the titanium compounds a catalyst which is not very active,as a renewed activation is necessary. The low-molecular-weight siloxane, used also for the preparation of the aluminum-siloxanes, such as tetramethyldisiloxane or cyclic methylhydrogentetrasiloxane, as well as the very unstable diethylhydrogensilanol are able to be prepared in pure form only with great costs and are practically not available commercially.

OBJECTS OF THE INVENTION

An object of the present invention is the production of polyethylene and modified polyethylene having a narrow molecular-weight distribution while avoiding the disadvantages of the prior art.

Another object of the present invention is the production of a catalyst for the production of polyethylene and modified polyethylene having a narrow molecular weight distribution consisting essentially of the reaction product prepared at a temperature of from −50°C to 100°C of (A) a reaction product prepared at a temperature of from 0° to 120°C of one mol of trialkyl aluminum having from two to eight carbon atoms in each of the alkyls with from one to two mols of a hydrogenpolysiloxane having a viscosity of from 5 to 100 cSt (25°C) and monomer units having the formula

wherein R is a member selected from the group consisting of alkyl having from one to six carbon atoms, cycloalkyl having from five to six carbon atoms and phenyl, said hydrogenpolysiloxane having the three available valences of its silicon atoms on the ends of the siloxane chain satisfied by R, hydrogen or, at most, one hydroxyl group per end silicon atom, with (B) a compound having a formula selected from the group consisting of

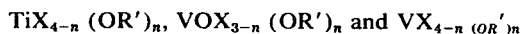

wherein X is halogen, R' is a member selected from the group consisting of alkyl having one to eight carbon atoms and cycloalkyl having from five to six carbon atoms, and n has a value between 0.1 and 2, and mixtures of the said compounds, said component B being employed in an amount of from 0.2 to 2 mols for each mol of said hydrogenpolysiloxane of Component A.

A further object of the invention is the development in a process for the production of polyethylene or modified polyethylene with a narrow molecular-weight distribution which comprises polymerizing monomers selected from the group consisting of ethylene and mixtures of ethylene with up to 10 mol percent of α-olefins having three to eight carbon atoms at a temperature of from 50°C to 120°C and a pressure of from 1 to 100 atmospheres in the presence of a polymerization catalyst prepared from (a) polymeric organo-silicon compounds containing hydrogen bonded to silicon, (b) compounds of heavy metals of the IV to VI sub-groups of the Periodic System, and (c) organo-aluminum compounds, the improvement which consists of utilizing as said polymerization catalysts, the reaction product prepared at a temperature of from −50°C to 100°C of (A)

a reaction product prepared at a temperature of from 0° to 120°C of one mol of trialkyl aluminum having from two to eight carbon atoms in each of the alkyls with from one to two mols of a hydrogenpolysiloxane having a viscosity of from 5 to 100 cSt (25°C) and monomer units having the formula

wherein R is a member selected from the group consisting of alkyl having from one to six carbon atoms, cycloalkyl having from five to six carbon atoms and phenyl, said hydrogenpolysiloxane having the three available valences of its silicon atoms on the ends of the siloxane chain satisifed by R, hydrogen or, at most, one hydroxyl group per end silicon atom, with (B) a compound having a formula selected from the group consisting of $TiX_{4-n}(OR')_n$, $VOX_{3-n}(OR')_n$ and $VX_{4-n}(OR')_n$ wherein X is halogen, R' is a member selected from the group consisting of alkyl having one to eight carbon atoms and cycloalkyl having from five to six carbon atoms, and n has a value between 0.1 and 2, and mixtures of said compounds, said component B being employed in an amount of from 0.2 to 2 mols for each mol of said hydrogenpolysiloxane of Component A.

These and other objects of the invention will become more apparent as the description thereof proceeds.

DESCRIPTION OF THE INVENTION

Now a process has been found for the preparation of polyethylene or modified polyethylene with a narrow molecular-weight distribution which comprises the polymerization of ethylene or mixtures of ethylene and up to 10 mol percent of α-olefins with three to eight carbon atoms, at pressures of 1 to 100 atmospheres and temperatures of from 50°C to 120°C, with the use of catalysts prepared from polymeric organo-silicon compounds having hydrogen bonded to silicon, organo-aluminum compounds and compounds of metals of the IV to VI sub-groups of the Periodic Table, whereby the mentioned disadvantages of the prior art are avoided. The process is characterized in that a polymerization catalyst is used, which is formed by the reaction of A. a reaction product, prepared at a maximum of 120°C, from one mol of trialkyl aluminum with alkyl groups of a chain length of from two to eight carbon atoms, and one to two mols of a hydrogenpolysiloxane having a viscosity from 5 to 100 cSt (25°C) with monomer units of the general formula

wherein R may be an alkyl radical with one to six carbon atoms, an aryl or a cycloalkyl radical, and the silicon atoms on the ends of the siloxane chain are saturated by R, hydrogen or by at most one hydroxyl group for each silicon atom, with B. a compound of the general formula $TiX_{4-n}(OR')_n$, $VOX_{3-n}(OR')_n$, $VX_{4-n}(OR')_n$, whereby n has a value between 0.1 and 2, X is halogen, and R' is a linear, branched or cyclic aliphatic radical with one to eight carbon atoms or from a reaction mixture of several halogen, haloalkoxy, halocycloalkoxy, alkoxy, or cycloalkoxy compounds of titanium, vanadium or chromium, at from −50°C to 100°C, preferably 20°C to 80°C.

The catalyst of the invention is therefore the reaction product prepared at a temperature of from −50°C to 100°C of (A) a reaction product prepared at a temperature of from 0° to 120°C of one mol of trialkyl aluminum having from two to eight carbon atoms in each of the alkyls with from one to two mols of a hydrogenpolysiloxane having a viscosity of from 5 to 100 cSt (25°C) and monomer units having the formula

wherein R is a member selected from the group consisting of alkyl having from one to six carbon atoms, cycloalkyl having from five to six carbon atoms and phenyl, said hydrogenpolysiloxane having the three available valences of its silicon atoms on the ends of the siloxane chain satisfied by R, hydrogen or, at most, one hydroxyl group per end silicon atom, with (B) a compound having a formula selected from the group consisting of $TiX_{4-n}(OR')_n$, $VOX_{3-n}(OR')_n$ and $VX_{4-n}(OR')_n$ wherein X is halogen, R' is a member selected from the group consisting of alkyl having one to eight carbon atoms and cycloalkyl having from five to six carbon atoms, and n has a value between 0.1 and 2, and mixtures of said compounds, said component B being employed in an amount of from 0.2 to 2 mols for each mol of said hydrogenpolysiloxane of Component A. More particularly, component B is an ester of titanic acid of the formulae

wherein X' is a chloride or a bromide and R'' is an alkyl having two to six carbon atoms or a mixture of $TiX'_4$ and $Ti(OR'')_4$ or $TiX'_4$ and $TiX(OR'')_3$ in such ratios that the amount of OR'' groups is at least 0.7 mols and not more than 2 mols, per mol of titanium. The said titanium tetrahalide-titanic acid ester mixture can be a reaction mixture as well.

The reaction of hydrogenpolysiloxanes and the trialkyl aluminum proceeds very quickly under mild conditions and surprisingly almost quantitatively. The preparation of the catalyst, used, according to the invention, requires thus only a slight expen.

The substantial advantages in regard to the necessary preparation of defined aluminumsiloxanes, according to the prior art, German (DOS) No. 1,936,205, consists that the reaction product A). used according to the invention, can be obtained at maximum of 120°C, at normal pressure and within a short time, and with no processing, for instance no vacuum distillation is required. Besides the whole reaction mass can be used for the reaction with the component (B). As the weight of the obtained product (A) corresponds to almost the sum of the weights of the charged compounds, which could not be expected from the prior art, an almost complete use of the starting materials is possible.

In the example of the reaction of triethyl aluminum and methylhydrogenpolysiloxane, the differences over the prior art are made clear:

|  | Preparation of the product used according to the invention. | German Offenlegungsschrift 1,936,205 Ex.4 |
|---|---|---|
| Weight of components used | 1.5 kg | 34.5 gm |
| Temperature °C | 70 | 120 |
| Time hr. | 3 | 24 |
| Pressure atm. | normal pressure | 1.8 |
| Reaction | continuously or discontinuously | only discontinuously |
| Solvent | none | heptane |
| Processing | none | vacuum distillation |
| Yield % (based on sum of the starting materials | 98–99 | 70 |
| Catalyst formation with titanium compounds | direct in simple reaction. | only after separation and renewed activation |

The reaction between trialkyl aluminum and hydrogen-polysiloxane proceeds exothermically and requires intensive cooling. Preferably, the reaction is conducted between 60° and 90°C. The reaction can be carried out both continuously and discontinuously. The molar ratio trialkyl aluminum/hydrogen-polysiloxane amounts preferably to 1, but may optionally lie somewhat below, such as at 0.75. Liquid, slightly viscous reaction masses are obtained, which are sensitive to air and moisture. They are, however, no longer spontaneously inflammable, and contain no trialkyl aluminum. They can be stored at room temperature under inert gas, such as nitrogen or argon indefinitely. They behave differently and more advantageously in the catalyst formation reaction and as catalyst components (higher yields, narrower molecular-weight distribution) than trialkyl aluminum or the aluminumsiloxane, used according to the process of German DOS No. 1,936,205. On the other hand, the reaction product A) is substantially more reactive than methylhydrogen-polysiloxane or its reaction product with aluminum chloride.

Preferably the reaction product A) is prepared from 1 mol of triethyl aluminum and 1 to 1.2 mols of methyl hydrogen-polysiloxane of a viscosity from 20 to 40 cSt (25°C).

Trialkyl aluminum with alkyl groups of a chain length of two to eight carbon atoms include, for example, such alkyl groups as ethyl, propyl, i-propyl, butyl, i-butyl, 2-ethyl-hexyl or n-octyl. Mostly triethyl aluminum is preferred. Suitable hydrogenpolysiloxanes are, for example, methylhydrogenpolysiloxanes, which are end-blocked with trimethylsilyl groups and have a viscosity from 20 to 40 cSt (25°C), ethylhydrogenpolysiloxanes, as above endblocked, with a viscosity from 25 to 40 cSt (25°C), phenylhydrogenpolysiloxanes, endblocked with triphenylsilyl groups, and a viscosity from 45 to 70 cSt (25°C), or linear 1,1,3,5,7,9,11,13,13-nonamethylheptasiloxane with a viscosity of 5 cSt (25°C). Preferred are the commercially available methylhydrogenpolysiloxanes with a viscosity from 25 to 35 cSt (25°C) which substantially are endblocked with trimethylsilyl groups and possess a hydroxyl group content from 0.05 to 0.2 percent, preferably 0.1 percent by weight.

For the formation of the catalyst, the reaction product (A) is reacted with the component (B). This is mostly done, for better intermixing, in the presence of slight amounts of inert solvents, particularly hydrocarbons having 5 to 9 carbon atoms, such as n-hexane, n-heptane, i-octane, cyclohexane, methylcyclohexane, benzene, toluene or xylene. For each mol of hydrogenpolysiloxane, 0.2 to 2 mols of compounds of the IV to VI sub-group elements or mixtures of them (component B) are used. The halogen compounds of the secondary-group elements are mostly chlorine and bromine compounds. Examples for component (B) are single compounds, such as $TiCl_3OR'$, $TiCl_2(OR')_2$, $VOCl(OR')$, $VOCl(OR')_2$, or reaction mixtures from $TiCl_4$, $TiBr_4$, $TiCl_3(OR')$, $TiCl_2(OR')_2$, $TiCl(OR')_3$, $Ti(OR')_4$, $VOCl_3$, $VCl_4$, $VOCl_2(OR')$, $VOCl(OR')_2$, $VO(OR')_3$, and $VX_{4-n}(OR')_n$, whereby R' represents linear, branched or cyclic aliphatic radicals with one to eight carbon atoms. The reaction mixtures from the single compounds are appropriately prepared by short heating of the components to from 40° to 60°C in a little inert solvent (equilibrium reaction). Preferably as component (B) trichlorotitanic acid esters, particularly trichloro-n-propyl titanate, are used, or a reaction product from 3 mols of titanium tetrachloride and 1 mol of tetra-n-propyl titanate. Furthermore, also, for instance, mixtures or reaction products of titanium tetrachloride, chlorotitanic acid esters and/or titanium orthoesters can be used advantageously, if, through the selection of the molar ratios of these compounds besides trichlorotitanic acid esters also titanium tetrachloride or dichlorotitanic acid esters are present in the mixture. Thereby the amount of tetrachloride or dichloride compound should, however, not surpass 70percent by weight in the mixture with the trichloro compound. Preferred in this case is a reaction product of titanium tetrachloride and tetra-n-propyl titanate or mixtures of titanium tetrachloride and trichloro-n-propyl titanate or of trichloro-n-propyl titanate and dichloro-di-n-propyl titanate, in which the amount of titanium tetrachloride or of dichloro-di-n-propyl titanate do not surpass 70 percent by weight.

The polymerization of ethylene can be conducted at normal pressure or higher pressures up to 100 atm., and preferably at 5 to 20 atm. The polymerization temperatures are between 50°C and 120°C, preferably between 60°C and 90°C. The reaction can be carried out batch-wise or continuously. Generally suspensions of the monomers are polymerized and inert solvents, such as mentioned above, for use in the catalyst preparation, are utilized. Preferable, however, are saturated hydrocarbons having five to nine carbon atoms. With the aid of a suitable fluid bed apparatus, the polymerization may also be carried out in the gas phase, whereby advantageously only very slight amounts of solvents are required, namely for dosing of the catalyst as suspension.

For the regulation of the molecular weight of the polymerizates, the polymerization temperature, the amount of catalyst and/or the OR'-content of the catalyst may be varied. Furthermore, the preparation of polyethylene or of the modified polyethylenes can be conducted in the presence of hydrogen, where up to 10 percent by volume of hydrogen, based on the charged ethylene, can be used.

α-Olefins with three to eight carbon atoms, may be utilized together with ethylene, for example, propylene, butene-1, 3-methylbutene-1,pentene-1, 4-methylpentene-1, hexene-1,heptene-1 and octene-1 or their mixtures in amounts of from 0 to 10 mol percent of the total monomer charge. In this event modified polyethylenes are obtained, which possess a reduced density, compared to pure polyethylene.

The polyethylenes and modified polyethylenes of varied molecular weight and varied density, preparable according to the invention, exhibit a narrow molecular-weight distribution and a correspondingly higher tensile strength than polymerizates of equal molecular weight, but with a wider molecular weight distribution.

As measure for the molecular weight distribution conventially the formula U (non-uniformity) = $\overline{M}w/\overline{M}n$ −1 is used. The values for the average weight of the molecular weight $\overline{M}_w$ and the numerical average of the molecular weight $\overline{M}_n$ are obtained, as follows:

a. The polymer product is split up by column fractionation, according to Francis et al. J. Poly. Sci., 31, 453–66 (1958), into 10 to 15 fractions; the weight or weight percent and the reduced specific viscosity of the fractions are determined.

b. The corresponding limiting viscosities according to Wesslau, Kunstoffe, 49, 230 (1959), and c. From this the corresponding average viscometric molecular weights $\overline{M}_v$ of the fractions according to Tung, High Polymers, 20, 514 (1956), are determined.

d. The determination of $\overline{M}_w$ and $\overline{M}_n$ is carried out from summation equations, according to Cottam, J. of Appl. Poly. Sci. 9, 1853-62 (1965), from the weights and $\overline{M}_v$ values of the single fractions.

The reduced specific viscosity $\eta$ red in dl/gm, determined at a concentration of 0.1 in Dekalin at 135°C serves as a measure of the molecular weight.

The density in gm/cm$^3$ is determined on strips from 1 mm-thick pressed plates by the buoyancy method (DIN 53479), solvent:butyl acetate, determination at 23°C, relative to water at 4°C = 1 gm/cm$^3$.

The tensile strength is measured as impact notch tensile strength in kp cm/cm$^2$ on strips from 1 mm-pressed plates (DIN 53448). The bulk density in gm/l is measured (DIN 53468).

The following examples are illustrative of the practice of the invention without being limitative in any manner.

EXAMPLE 1

Into a well heated 2-liter flask, provided with a magnetic agitator, which had been flushed with nitorgen, 983 gm (8.6 mol) of technical triethyl aluminum were charged. At 20°C, the dropping-in of a total of 517 gm (8.6 mol) of methylhydrogenpolysiloxane ($n_D25°$=1.3970; 30 cSt at 25°C; end-blocked with methyl groups, hydroxyl content 0.1 percent by weight) was started. The reaction exothermed immediately with light gas evolution. At 55°C, the dropping-in was interrupted for a time, until the inside termperature had risen to 70°C. The further addition of the polysiloxane was now conducted with cooling at 70°C. The total duration of dropping-in was 2 hours. Subsequently, the heating at 70°C was continued for one hour. After cooling, a colorless, slightly viscous liquid, weighing 1477.5 gm (reaction product A) was obtained. This is a yield of 98.5 percent, based on the sum of the starting substances. By analysis, according to Jordan, Anal. Chemistry, 40, 2150 (1968), it was shown that the reaction product A) contains no "active aluminum", triethyl aluminum, and diethyl aluminumhydride. Also its behavior towards titanium tetrachloride showed that free triethyl aluminum was no longer present. With the addition of 0.1 ml of titanium tetrachloride to 20 ml of 0.01 molar solution of triethyl aluminum in isooctane, cooled to 0°C, a spontaneous reaction, with formation of a heterogenous separation is observed. In the comparison test with 20 mol of a 1-molar solution of reaction product (A), prepared by the above example, a precipitate is observed only after 5 minutes.

If the methylhydrogenpolysiloxane is charged and the triethyl aluminum is added dropwise, and otherwise the procedure is identical to example 1, almost identical results were obtained.

EXAMPLE 2

For the continuous preparation of a reaction product (A) from methylhydrogenpolysiloxane and triethyl aluminum, a cascade apparatus, consisting of two 500 ml flasks, equipped with magnetic agitator, and one 2 liter storage vessel, was used.

As described in example 1, in the first reaction flask 200 ml of reaction product was prepared and the overflow adjusted to this volume. Then each hour 61 ml of siloxane and 139 ml of aluminum compound (molar ratio=1) were added dropwise in a constant quantitative ratio at 70°C. The volume of 200 ml remained constant through the overflow. In the second reaction flask, whose volume was also adjusted to 200 ml, by overflow into the storage vessel, and which was kept at 70°C, the time of stay was also 1 hour. The total time of stay (or reaction) was, therefore, 2 hours. After 6 hours of operation, 986 ml of a slightly viscous liquid was obtained in the storage vessel. The analysis for triethyl aluminum or diethyl aluminumhydride was negative.

EXAMPLE 3

114 gm of technical triethyl aluminum (1 mol) were charged into a 500 ml flask. From a dropping funnel 82 gm (1.1 mol) of ethylhydrogenpolysiloxane (viscosity 35 cSt (25°C), endblocked with trimethylsilyl groups), were added, as described in example 1). After a total reaction time of 2½ hours, 2 hours of them at 75°C, a slightly yellowish, viscous liquid was obtained in an amount of 181.5 gm. The reaction product (A) contained no triethyl aluminum. The reaction product A), thus prepared, gave together with trichloro-n-propyl titanate, an ethylene polymerization catalyst, which lead to polymerizates with a narrow molecular-weight distribution.

EXAMPLE 4

100 gm (0.88 mol) of triethyl aluminum were added dropwise to 60 gm (1 mol) of 1,1,3,5,7,9,11,13,13-nonamethylheptasiloxane having a viscosity of 5 cSt at 25°C, a density of 0.922 gm/cm$^3$ and a b.p. of 120°C at 20 mm Hg, under cooling at 70° to 73°C. During the dropping-in, slight gas evolution was observed. The total reaction time was 3 hours, 2¼ hours of it dropping-in time. A colorless liquid (142 gm) was obtained, which does not contain any free triethy' aluminum.

By reaction of this liquid with an equilibrium mixture of 3 mols of titanium tetrachloride and 1 mol of tetra-n-propyl titanate, a highly active catalyst was obtained, which, employed in ethylene polymerization, led to narrow molecular weight distributed products.

EXAMPLE 5

600 ml of isooctane were filled into a 1 liter autoclave, equipped with agitator and cooling jacket, with exclusion of air and humidity. Then a catalyst suspension (catalyst from 1 gm of starting materials) was added, which catalyst was prepared in larger amounts, as follows:

5 ml of reaction product (A), prepared according to example 1), and 9 gm (42.2 m mol) of trichloro-n-propyl titanate in 15 ml of isooctane were reacted for 2 hours at 60°C with good agitation and under nitrogen atmosphere to give the desired catalyst.

After closing of the autoclave, a mixture of ethylene and 0.5 percent by volume of hydrogen at 75°C was pressed in, to give a pressure of 10 atms. and the mixture was polymerized for 2 hours at 75°C while maintaining the pressure by impressing the gaseous mixture as required. After cooling, deactivation of the catalyst and usual processing, 288 gm of polyethylene with the following properties were obtained:

$\eta$ red = 2.98
U = 1.4
D = 0.955 gm/cm$^3$
Notched tensile strength = 222 kp cm/cm$^2$
Bulk density (DIN 53468) = 409 gm/l A polyethylene, prepared, according to the prior art, with a catalyst of methylhydrogenpolysiloxane, aluminum chloride and titanium tetrachloride, had at the same molecular weight and density, a non-uniformity U of 14 and a notched tensile strength of 110 kp cm/cm$^2$.

Comparison Experiments 5 a. Use of a reaction product of 5 ml of methylhydrogenpolysiloxane and 0.5 gm of aluminum chloride, prepared at 55°C until dissolved, in the catalyst preparation instead of 5 ml of A). Under analogous experimental and polymerization conditions, no polyethylene is obtained.

5 b. Use of 5 ml of triethyl aluminum instead of 5 ml A) in the catalyst preparation, solvent: 50 ml instead of 15 ml, of isooctane.

Under otherwise identical experimental conditions, after a polymerization time of 1 hour and 20 minutes only 132 gm of polyethylene were obtained with a $\eta$ red of 4.31. On the basis of the low bulk density of the polyethylene of only 222 gm/l, the polymerization time of 2 hours could not be maintained (the suspension became too highly viscous, agitation was no longer possible).

5 c. When 5 ml of diethyl aluminum chloride instead of 5 ml of reaction product (A) were used, under otherwise identical conditions of catalyst preparation and polymerization, similar results as in the comparison example 5 b) were obtained:

Polymerization time: 1¼ hours
Yield: 107 gm of polyethylene
$\eta$ red = 4.31
Bulk density = 231 gm/l 5 d. Catalyst preparation, as described in example 5), but from 5 ml of reaction product (A) from example 1 and 5.7 gm of TiCl$_4$. Under analogous polymerization conditions, 214 gm of polyethylene with the following properties were obtained:

$\eta$ Red = 6.29
U = 20
D = 0.942 gm/cm$^3$
Bulk density = 288 gm/l
The polyethylene had a high non-uniformity.

5 e. 5 ml of an alumosiloxane, prepared according to prior art (German DOS No. 1,936,205) from methylhydrogenpolysiloxane, of the formula (CH$_3$) (C$_2$H$_5$) HSiOAl (C$_2$H$_5$)$_2$, was charged instead of the reaction product (A) for the catalyst preparation, analogous to example 5. Under also analogous polymerization conditions only 187 gm of polyethylene were obtained, with the following properties:

$\eta$ red = 5.4
U = 2
D = 0.952 gm/cm$^3$

On the basis of the high molecular weight, the product could be processed only with difficulty by the conventional thermoplastic forming processes, except for the preparation of pressed plates.

5 f. If 42.2 m mol of chloro-tri-n-propyl titanate or tetra-n-propyl titanate instead of trichloro-n-propyl titanate were used, analogous to example 5, under otherwise identical experimental and polymerization conditions, no solid polyethylene is obtained.

5 g. Example of a catalyst formation in situ from the compound, used in example 5. The quantitative ratios were taken from the examples of the prior art (British Pat. No. 1,016,512). Instead of titanium tetrachloride, trichloro-n-propyl titanate was used. In the described 1 liter autoclave, 600 ml of isooctane were heated under an atmosphere of ethylene to 60°C. Then in a short period, with exclusion of air and moisture, 0.24 gm of trichloro-n-propyl titanate, dissolved in 2 ml of isooctane, 0.26 gm of methylhydrogenpolysiloxane and 0.5 gm of triethyl aluminum were added. Already at the addition of the aluminum compound, the formation of catalyst and of polyethylene could be observed. The product formed fibers and strongly adhered to the agitator and the walls of the polymerization vessel. The ethylene polymerization was carried out under the conditions of the example 5. After processing, where a wet milling was necessary, 78 gm of fibrous polyethylene powder are obtained.

$\eta$ red = 11.2
Bulk density = 116 gm/l

A catalyst, prepared from the above-named amounts of aluminum and titanium compounds and 0.8 gm of methylhydrogenpolysiloxane, gave a similar result.

EXAMPLES 6 TO 8

The influence of the amount of alkoxy groups in the catalyst on its polymerization activity, also on the molecular weight, the non-uniformity and the bulk density is illustrated in the following examples by n-propoxy groups. The preparation of the catalysts was carried out each time from 5 ml of reaction product (A) from example 1) and a mixture each time of 6 gm of titanium tetrachloride and increasing amounts of tetra-n-propyl titanate, which was prepared in little isooctane and held during 15 minutes at 50°C. The conditions of catalyst preparation and polymerization were as in example 5. Each time 1 gm of catalyst, based on the starting substances, was used. Table I shows the conditions and resulting polymer values.

TABLE I

| Ex. No. | Grams of Ti(OC$_3$H$_7$)$_4$ (6 gm. TiCl$_4$) | Time of polymerization, hour | Grams of polyethylene | $\eta$ Red | U | Bulk density, gm./l. |
|---|---|---|---|---|---|---|
| 6 | 2.36 | 1½ | 215 | 1.7 | 2.5 | 303 |
| 5 | 3 | 2 | 288 | 2.98 | 1.4 | 409 |
| 7 | 4.28 | 2 | 334 | 3.52 | 2.1 | 468 |
| 8 | 5.36 | 2 | 254 | 4.07 | 2.6 | 440 |

EXAMPLE 9

Into a 100 liter (pot volume) autoclave, in which 89 liters of a catalyst-containing polyethylene suspension in isooctane with a concentration of 33 percent by weight was stirred at 85°C and 8.8 atm. gas pressure (ethylene/hydrogen-mixture), were added each hour: 3.05 Nm³ of ethylene, 16.2 N liters of hydrogen and 10 liters of isooctane, which contain 10 gm of catalyst, based on the starting substances. The catalyst was prepared in larger quantities from 123.6 ml of reaction product (A) from example 1 and a product prepared from 74.2 ml of tetra-n-propyl titanate and 82 ml of titanium tetrachloride in 371 ml of isooctane held at equilibrium during 2 hours at 60°C.

Polymerization suspension was removed from the autoclave in such a manner that the suspension volume remained constant. After releasing the pressure, processing and drying of the polymerization product, 3.46 kg of polyethylene per hour were obtained, with the following properties:

$\eta$ red = 1.1
U = 2.3
D = 0.964 gm/cm³
Notched tensile strength = 54 kp cm/cm²
Bulk density = 474 gm/l The catalyst, used in example 9, could also be prepared continuously as follows:

130 ml of a catalyst suspension in isooctane as suspending agent, were agitated strongly at 60°C in a graduated vessel, equipped with a heating mantle, of 250 ml volume. Each hour 24.7 ml of reaction product (A), and 105.4 ml of an isooctane solution of an equilibrium product from 14.8 ml of tetra-n-propyl titanate and 16.4 ml of titanium tetrachloride were dropped in. By overflow into a storage vessel, the reaction volume was kept constant. In the storage vessel the product was then appropriately diluted.

EXAMPLES 10 — 12

The polymerization was conducted, as described in example 9. For the polymerization a gas mixture (premixed gas) of ethylene and 0.33 percent by volume of hydrogen was used. By variation of the polymerization temperature, a narrow-distributed and highly dense polyethylene of various molecular weights (see Table II) in a high space-time-yield and at a low consumption of 2.6 to 3 gm per kg of polyethylene were obtained as shown in Table II.

TABLE II

| Ex. No. | Polymerization temp., °C. | Polyethylene per hour, kg. | $\eta$ Red | U | Density, gm./cm. | Notched tensile strength, kp. cm./cm.² |
|---|---|---|---|---|---|---|
| 10 | 65 | 3.82 | 2.2 | 2.2 | 0.952 | 156 |
| 11 | 75 | 3.85 | 1.6 | 2.3 | 0.955 | 84 |
| 12 | 85 | 3.34 | 1.38 | 2.0 | 0.961 | 75 |

EXAMPLES 13 – 16

The process, described in example 9, was applied to a continuous polymerization of a mixture of ethylene and butene-1 in the presence of hydrogen. 12 gm of catalyst per hour were used instead of 10 gm. The catalyst preparation was conducted in 495 ml of isooctane during 3½ hours at 50°C. Butene-1 was dosed in as a liquid. Modified polyethylene types of reduced density, high tensile strength and narrow molecular weight distribution were obtained. The mol percent of $C_4H_8$ and Vol percent of $H_2$ were based on ethylene charged. Table III shows the reaction conditions and the products obtained.

TABLE III

| Ex. No. | Polymerization temperature, °C. | Mol percent $C_4H_8$ | Volume percent $H_2$ | Polymer per hour, kilogram | $\eta$ Red | U | Density, gm./cm.³ | Notched tensile strength, kp.cm., cm. |
|---|---|---|---|---|---|---|---|---|
| 13 | 75 | 0.24 | 0.27 | 3.76 | 1.38 | 2.1 | 0.956 | 74 |
| 14 | 75 | 0.28 | 0.44 | 3.25 | 1.20 | 1.7 | 0.957 | 60 |
| 15 | 65 | 0.54 | 0.08 | 5.0 | 2.96 | 2.3 | 0.943 | 251 |
| 16 | 65 | 0.80 | 0.28 | 3.42 | 1.11 | 1.7 | 0.950 | 69 |

EXAMPLE 17

85.5 gm (0.70 mol) of phenylhydrogenpolysiloxane (60 cSt at 25°C) were added dropwise with agitation and under nitrogen to 80.3 gm of triethyl aluminum (0.70 mol). The reaction was at first exothermic, the pot temperature rose from 20°C to 42°C. Without interrupting the dropping-in, the temperature was raised to 85°C by heating, and the reaction terminated at this temperature. The total dropping-in time was 1 hour and the total reaction time was 3½ hours. After this time the product was free of triethyl aluminum. 165.3 gm of slightly viscous, yellowish reaction product (A) were obtained. In an after-connected cooling trap, only 0.5 gm of condensate was found.

For the ethylene polymerization, 1 gm (based on starting substances) of a catalyst were used, prepared from 5 ml of the above-prepared reaction product A), 2.8 ml of tetra-n-propyl titanate and 3.48 ml of $TiCl_4$, at 60°C during 2 hours in 15 ml of isooctane. The polymerization conditions were as described in example 5. 234 gm of narrowly distributed polyethylene powder, with the following properties were obtained:

$\eta$ red = 2.2
U = 2.5
Density = 0.954 gm/cm³
Bulk density = 340 gm/l

The preceding specific embodiment is illustrative of the practice of the invention. It is to be understood, however, that other expedients known to those skilled in the art may be employed without departing from the spirit of the invention.

EXAMPLE 18

Method as described in Example 5. 4.5 g (23.7 mMol) of titanium tetrachloride, 3.0 g (10.6 mMol) of trichloro-n-propyl titanate and 1.37 g (7.9 mMol) of vanadium-oxy-trichloride is mixed to form the catalyst Component B). After reacting Component B) with Component (A) an almost black reaction product is obtained.

After processing, 245 g of polyethylene with the following properties are obtained:

$\eta$ red = 3.52
U = 3.2

EXAMPLE 19

Method as described in Example 18. Component B): 5.78 g (31.6 mMol) of VOCl$_2$OC$_2$H$_5$, Kp: 70°/11 Torr, and 2.26 g (10.6 mMol) trichloro-n-propyl titanate.

211 g of polyethylene with the following properties are obtained:

η red = 4.15
U = 3.4 The product has a fibrous structure.

We claim:

1. A catalyst for the production of polyethylene and modified polyethylene having a narrow molecular weight distribution consisting essentially of the reaction product prepared at a temperature of from −50°C to 100°C of (A) a reaction product prepared at a temperature of from 0 to 120°C of one mol of trialkyl aluminum having from two to eight carbon atoms in each of the alkyls with from one to two mols of a hydrogenpolysiloxane having a viscosity of from 5 to 100 cSt (25°C) and monomer units having the formula

wherein R is a member selected from the group consisting of alkyl having from one to six carbon atoms, cycloalkyl having from five to six carbon atoms and phenyl, said hydrogenpolysiloxane having the three available valences of its silicon atoms on the ends of the siloxane chain satisfied by R, hydrogen or, at most, one hydroxyl group per end silicon atom, with (B) a compound having a formula selected from the group consisting of

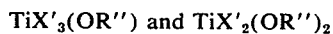

wherein X is halogen, R' is a member selected from the group consisting of alkyl having one to eight carbon atoms and cycloalkyl having from five to six carbon atoms, and n has a value between 0.1 and 2, and mixtures of said compounds, said component B being employed in an amount of from 0.2 to 2 mols for each mol of said hydrogenpolysiloxane of Component A.

2. The catalyst of claim 1 wherein said trialkyl aluminum is triethyl aluminum.

3. The catalyst of claim 1 wherein said hydrogenpolysiloxane is methylhydrogenpolysiloxane having a viscosity of from 20 to 40 cSt (25°C).

4. The catalyst of claim 3 wherein said methylhydrogensiloxane has a viscosity of from 25 to 35 cSt (25°C) and is substantially endblocked with trimethylsilyl groups and has a hydroxy content of from 0.05 to 0.2 percent by weight.

5. The catalyst of claim 3 wherein said component B is a compound selected from the group consisting of 1) esters of halotitanic acids having the formulae TiX'$_3$(OR'') and TiX'$_2$(OR'')$_2$ wherein X' is a halide selected from the group consisting of chlorine and bromine, and R'' is an alkyl having two to six carbon atoms and 2) mixtures of TiX'$_4$ and Ti(OR'')$_4$ and 3) mixtures of TiX'$_4$ and TiX(OR'')$_3$ where X' and R'' have the above-assigned values, in such ratios that the amount of OR'' group is at least 0.7 mols and not more than 2 mols, per mol of titanium.

6. In a process for the production of polyethylene or modified polyethylene with a narrow molecular-weight distribution which comprises polymerizing monomers selected from the group consisting of ethylene and mixtures of ethylene with up to 10 mol percent of α-olefins having three to eight carbon atoms at a temperature of from 50°C to 120°C and a pressure of from 1 to 100 atmospheres in the presence of a polymerization catalyst prepared from (a) polymeric organo-silicon compounds containing hydrogen bonded to silicon, (b) compounds of heavy metals of the IV to VI sub-groups of the Periodic System, and (c) organo-aluminum compounds, the improvement which consists of utilizing as said polymerization catalyst, the reaction product prepared at a temperature of from −50°C to 100°C of (A) a reaction product prepared at a temperature of from 0° to 120°C of one mol of trialkyl aluminum having from two to eight carbon atoms in each of the alkyls with from one to two mols of a hydrogenpolysiloxane having a viscosity of from 5 to 100 cSt (25°C) and monomer units having the formula

wherein R is a member selected from the group consisting of alkyl having from one to six carbon atoms, cycloalkyl having from five to six carbon atoms and phenyl, said hydrogenpolysiloxane having the three available valences of its silicon atoms on the ends of the siloxane chain satisfied by R, hydrogen or, at most, one hydroxyl group per end silicon atom, with (B) a compound having a formula selected from the group consisting of

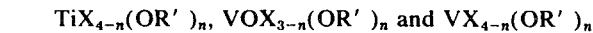

wherein X is halogen, R' is a member selected from the group consisting of alkyl having one to eight carbon atoms and cycloalkyl having from five to six carbon atoms, and n has a value between 0.1 and 2, and mixtures of said compounds, said component B being employed in an amount of from 0.2 to 2 mols for each mol of said hydrogenpolysiloxane of Component A.

7. The process of claim 6 wherein said trialkyl aluminum is triethyl aluminum.

8. The process of claim 6 wherein said hydrogenpolysiloxane is methylhydrogenpolysiloxane having a viscosity of from 20 to 40 cSt (25°C).

9. The process of claim 6 wherein said methylhydrogensiloxane has a viscosity of from 25 to 35 cSt (25°C) and is substantially endblocked with trimethylsilyl groups and has a hydroxy content of from 0.05 to 0.2 percent by weight.

10. The process of claim 6 wherein said component B is a compound selected from the group consisting of (1) esters of halotitanic acids having the formulae

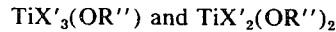

wherein X' is a halide selected from the group consisting of chlorine and bromine, and R'' is an alkyl having two to six carbon atoms and (2) mixtures of TiX'$_4$ and Ti(OR'')$_4$ and 3) mixtures of TiX'$_4$ and TiX(OR'')$_3$ where X' and R'' have the above-assigned values, in such ratios that the amount of OR'' group is at least 0.7 mols and not more than 2 mols, per mol of titanium.

11. The process of claim 6 wherein said polymerizing is conducted in the presence of up to 10 percent by volume of hydrogen, based on the ethylene charged.

12. The process of claim 6 wherein said polymerizing is conducted in the presence of a saturated hydrocarbon solvent having five to nine carbon atoms.

* * * * *